United States Patent [19]

Schwab et al.

[11] Patent Number: 4,729,785
[45] Date of Patent: Mar. 8, 1988

[54] PREPARATION OF ACICULAR FERROMAGNETIC METAL PARTICLES CONSISTING ESSENTIALLY OF IRON

[75] Inventors: Ekkehard Schwab, Neustadt; Werner Steck, Ludwigshafen; Peter Rudolf, Maxdorf; Guenter Vaeth, Limburgerhof; Helmut Jakusch, Frankenthal; Jenoe Kovacs, Hessheim, all of Fed. Rep. of Germany

[73] Assignee: BASF Aktiengesellschaft, Ludwigshafen, Fed. Rep. of Germany

[21] Appl. No.: 856,972

[22] Filed: Apr. 29, 1986

[30] Foreign Application Priority Data

May 10, 1985 [DE] Fed. Rep. of Germany ....... 3516884

[51] Int. Cl.[4] .............................................. C22C 1/04
[52] U.S. Cl. .............................. 75/0.5 AA; 75/0.5 BA
[58] Field of Search ...................... 75/0.5 AA, 0.5 BA

[56] References Cited

U.S. PATENT DOCUMENTS

| | | |
|---|---|---|
| 2,694,656 | 11/1964 | Camrac ............................. 252/62.5 |
| 3,015,627 | 1/1962 | Ayers et al. . |
| 3,015,628 | 1/1962 | Ayers et al. . |
| 3,082,067 | 3/1963 | Hund . |
| 3,607,220 | 9/1971 | vander Giessen et al. .... 75/0.5 AA |
| 4,056,410 | 11/1977 | Corradi et al. ................. 75/0.5 BA |
| 4,133,677 | 1/1979 | Matsui et al. .................. 75/0.5 AA |
| 4,290,799 | 9/1981 | Schroeder et al. ............. 75/0.5 BA |
| 4,439,231 | 3/1984 | Steck et al. .................... 75/0.5 AA |
| 4,514,216 | 4/1985 | Mishima et al. ............... 75/0.5 AA |

FOREIGN PATENT DOCUMENTS 1176111 8/1964 Fed. Rep. of Germany .

OTHER PUBLICATIONS

Derwent Abstract of Japanese document No. 52-153198, 12/20/77 (published application No. 51-070231).
Derwent Abstract of Japanese document No. 52-121,799, Oct. 13, 1977 (application No. 51-039027).

Primary Examiner—John P. Sheehan
Attorney, Agent, or Firm—Keil & Weinkauf

[57] ABSTRACT

Acicular metal particles consisting essentially of iron are prepared by reducing α-iron(III) oxide obtained—by dehydration—from acicular iron(III) oxide hydroxide prepared in the presence of phosphate ions and having a shape-stabilizing surface coating.

1 Claim, 1 Drawing Figure

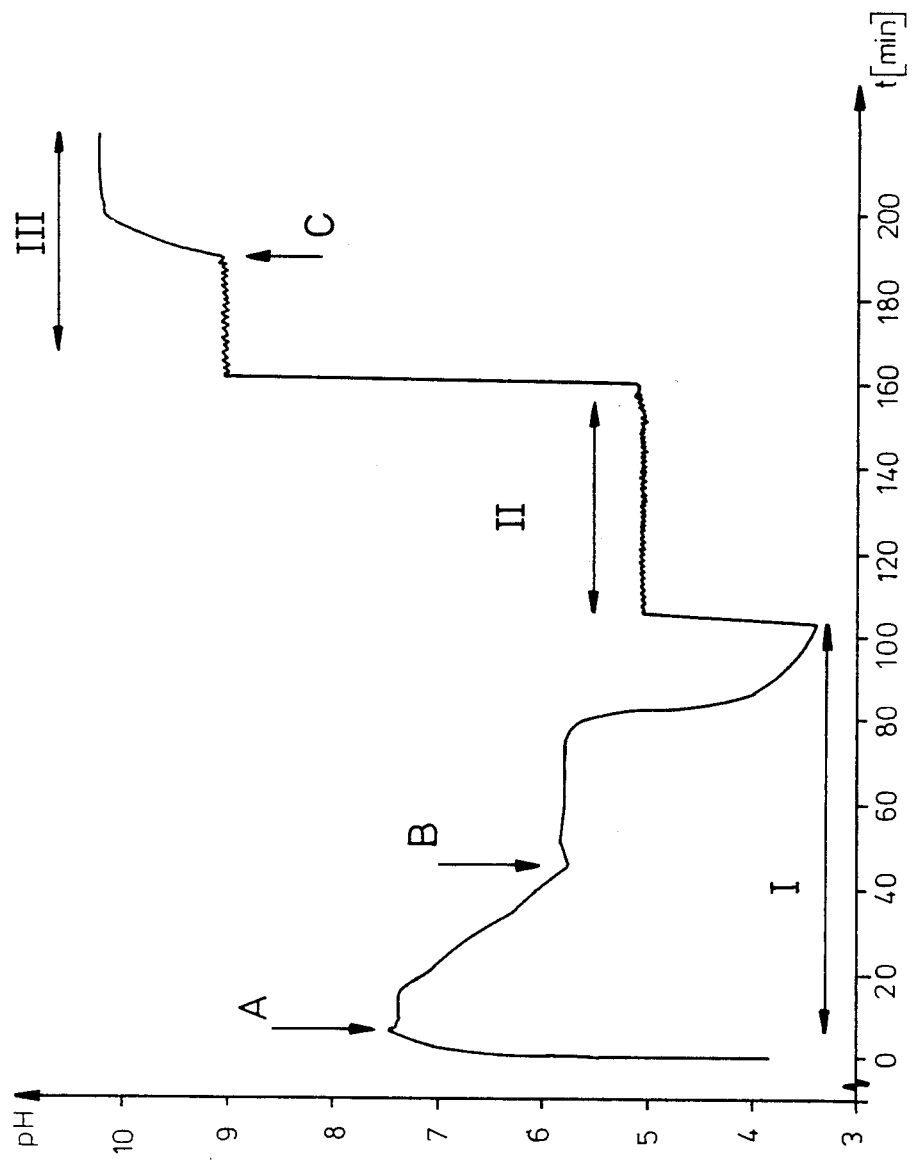

PREPARATION OF ACICULAR FERROMAGNETIC METAL PARTICLES CONSISTING ESSENTIALLY OF IRON

The present invention relates to a process for preparing acicular ferromagnetic metal particles which consist essentially of iron and contain phosphate ions and, if desired, further additives, and to their use for manufacturing magnetic recording media.

Ferromagnetic metal powders are, by reason of their high saturation magnetization and the fact that the particles are anisotropic and hence exhibit high coercive forces, of particular interest for the manufacture of magnetic recording media because they bring about a considerable increase in the energy product and hence in the recording density, and thus give media exhibiting narrower signal widths and higher signal amplitudes.

It is known to prepare iron particles by reducing finely divided acicular iron compounds, for example the oxides or oxide hydroxides, with hydrogen or some other gaseous reducing agent. It is preferred to use acicular iron(III) oxide hydroxides, from which the corresponding metal particles are prepared by heating and reduction and subsequent passivation.

In the literature acicular iron oxide hydroxide is prepared by the acid process. In this two-stage process, an Fe(II) salt solution is first of all treated to precipitate some of the Fe(II) in the form of $Fe(OH)_2$, which is oxidized with air to FeOOH nuclei. In a second step, the FeOOH nuclei grow into the end product as a result of further oxidation of the Fe(II) ions at below pH 7. This process is described, inter alia, in U.S. Pat. No. 2,694,656 and German published application DAS No. 1,061,760, in connection with the preparation of the α- and γ-modifications, respectively, for magnetic recording media. A number of publications have also disclosed variants in which the iron oxide hydroxide pigment is doped with foreign ions. Apart from transition metal cations, for example Zn (German published application DAS No. 1,300,861), anions and especially those which contain elements of main group V can affect the course of the synthesis reaction and the product properties. German published application DAS No. 1,176,111 proposes introducing $PO_4^{3-}$-ions in the nucleation phase before the start of the Fe(II) oxidation, giving α-FeOOH in the form of short needles. The addition of phosphate ions in the γ-FeOOH synthesis described in German published application DAS No. 1,219,009 results in the formation of substantially isometric particles which are therefore unsuitable for the preparation of high-grade magnetic materials. In German published application DAS No. 1,225,157 this process is combined with the addition of phosphate ions after the nucleation or during the growth step, while according to German published application DAS No. 1,223,352 the needle shape can be affected by additions of arsenate or arsenate/phosphate.

A number of proposals have also been made in connection with the further process steps of preparing the metal particles by dehydrating and heating the iron oxide hydroxides, and the reduction of the resulting iron oxides.

The external shape of the desired metal particles is determined to a considerable extent by the shape of the iron oxide hydroxide particles used as starting material. In order to substantially suppress sintering during the conversion steps of heat treatment and reduction, shape-stabilizing coatings are applied to the iron oxide hydroxide particles. A number of substances suitable for this purpose has already been disclosed. For example, German Laid-Open application DOS No. 2,646,348 describes the use of hydrolysis-resistant oxygen acids of phosphorus, and the salts or esters thereof, and aliphatic monobasic or polybasic carboxylic acids; German patent No. 1,907,691 describes the use of tin compounds; Japanese Preliminary Published application Nos. 51-39,027 and 51-70,231 describe the use of silicates; and U.S. Pat. No. 4,280,918 describes the use of colloidal silicon dioxide. It has also been attempted to influence the properties of the end product during the heat treatment of the iron oxide hydroxides, i.e. during the dehydration thereof to α-$Fe_2O_3$. For instance, EP-A-No. 24,692 describes a heat treatment in a steam-containing atmosphere.

Various reduction methods have also been disclosed. German Laid-Open application DOS No. 3,228,669 describes the stepwise reduction of the oxidic materials. In the first step, the decomposition of an organic substance previously applied to the oxides in an inert gas atmosphere brings about partial reduction and, in the second step, the prereduced material is reduced with hydrogen to the metal. Other processes use only hydrogen for the reduction, and it has been variously proposed to apply reaction-accelerating substances to the oxides in order to be able to carry out the reduction at lower temperatures. For instance, German Laid-Open application DOS No. 2,014,500 discloses the application of silver or silver compounds for this purpose, and German Laid-open application DOS No. 1,907,691 describes the treatment of iron oxide with tin(II) chloride.

The many and varied attempts to prepare ferromagnetic metal particles consisting essentially of iron show that the demands on the product used as magnetic material for magnetic recording layers are very high. It is precisely because the corresponding metal particles are, by virtue of their excellent magnetic properties, compared with the oxidic materials, the obvious choice for use in media for high-density recording that a number of the product parameters which have a bearing on the mechanical and recording properties also have to meet special requirements. For instance, it is essential that the magnetic material be very finely divided in order to obtain a magnetic layer with a smooth surface, which is important in the case of media for recording video signals, and to achieve a favorable signal-to-noise ratio. However, the signal-to-noise ratio can only be determined after incorporation of the magnetic material into the magnetic layer.

It is an object of the present invention to provide a process for preparing acicular ferromagnetic metal particles consisting essentially of iron, which can be carried out in a simple manner and yields metal particles which, on the one hand, have the necessary magnetic recording properties, for example a coercive force of from 60 to 80 kA/m, and, on the other, after incorporation into the magnetic layer, give video recording media exhibiting high luminance signal-to-noise ratios.

We have found that this object is achieved, surprisingly, by a process for preparing acicular ferromagnetic metal particles consisting essentially of iron and having the required properties by reducing an α-iron(III) oxide obtained—by dehydration—from an acicular iron(III) oxide hydroxide provided with a shape-stabilizing surface coating, which is based on the acid process and comprises producing, in a first stage, γ-FeOOH nuclei from iron(II) salt solutions in the presence of from 0.5 to 1.5% by weight, based on the amount of $\gamma$-FeOOH end product, of phosphate ions by adding alkalis with simultaneous oxidation by passing in air, and then, in a second stage, permitting these nuclei to grow, at a reaction suspension pH of 4.0-5.5, into the $\gamma$-FeOOH end product, and subsequently providing the surface of the $\gamma$-FeOOH particles in the reaction suspension with a silicon dioxide and/or tin dioxide coating, and after isolation of the coated particles, dehydrating them at 350°-600° C. to $\alpha$-iron(III) oxide which is reduced to the metal at 300°-450° C. in a reducing atmosphere.

In the process of the invention, $\gamma$-FeOOH (lepidocrocite) is prepared from iron(II) salt solutions with alkalis and simultaneous oxidation by the acid synthesis method. It has been found to be particularly advantageous to start from an aqueous iron(II) chloride solution and then add an alkali, such as an alkali metal hydroxide or ammonia, while heating at temperatures of from 10° to 36° C., introducing air and effecting vigorous stirring (for producing fine air bubbles), to form iron(III) oxide hydroxide nuclei in an amount of from 25 to 60 mol % of the starting iron. The addition of the phosphate ions in the form of orthophosphoric acid and/or its primary and/or secondary and/or tertiary alkali metal and ammonium salts is advantageously carried out before the Fe(OH)$_2$ precipitation, but must be carried out at the latest by the time, measured from the beginning of the oxidation, it takes the pH to reach the salient point B in the curve, as shown in the pH/time diagram (FIG. 1). The phosphate ions are used in amounts of from 0.5 to 1.5% by weight, preferably from 0.75 to 1.0% by weight, based on $\gamma$-FeOOH end product. The nuclei then grow into the end product at 20°-70° C. and a pH of 4.0-5.8, which is kept in this range by the addition of further amounts of alkali, while ensuring that air is finely dispersed throughout the suspension. On completion of nuclei growth, the iron(III) oxide hydroxide solids content in the aqueous suspension is from 10 to 65 g/l.

These lepidocrocite particles are then provided with a shape-stabilizing coating in the reaction suspension at pH 8-10.5 by applying thereto from 1 to 3% by weight, preferably 1.5 by weight, of silicon in the form of sodium silicate, as described in U.S. Pat. No. 4,133,677, and/or from 1 to 3% by weight, preferably 1.5% by weight, of tin, as described in German patent No. 1,907,691. After separation from the suspension and drying, the $\gamma$-FeOOH particles thus obtained are dehydrated at 350°-600° C. in an inert gas atmosphere to $\alpha$-Fe$_2$O$_3$, and then reduced in a conventional manner at 300°-450° C. with hydrogen to the metal. It is advisable to passivate the finely divided metal powders thus obtained by passing an air or oxygen/inert gas mixture thereover in order to reduce the risk of spontaneous ignition of the particles.

When carrying out the process according to the invention, it may be advantageous, for certain applications, to first prereduce the coated $\alpha$-iron(II) oxide by means of decomposable organic compounds at 270°-650° C. in an inert gas atmosphere to FeO$_x$, x being greater than or equal to 1.33 and smaller than or equal to 1.40, and then to convert the FeO$_x$ by means of a reducing gas, e.g. hydrogen and/or carbon monoxide, into the metallic form.

The metal particles prepared according to the invention are highly suitable for use as magnetic material for magnetic recording media, such as audio tapes, data recording media and, in particular, video tapes. The recording media are manufactured in a conventional manner. To this end, the metal powder is dispersed together with the customary additives such as dispersants, sodium oleate, zinc oleate, sodium laurate, sodium palmitate, sodium stearate, with or without non-magnetic fillers, such as quartz powder, silicate-based powders, aluminum oxide or zirconium oxide, and binders dissolved in organic solvents, e.g. elastomeric polyurethanes, epoxy resin, vinyl chloride/vinyl acetate copolymers, OH-containing polyurethanes crosslinked with isocyanates, and mixtures thereof, in a dispersing unit, such as a tubular or stirred ball mill. The magnetic dispersion is then applied by means of a customary coating machine to the non-magnetic base. Suitable non-magnetic bases are the usual base materials, in particular films made of linear polyesters, such as polyethylene terephthalate, and ranging in thickness in general from 4 to 20 $\mu$m. Before the still fluid coating mixture is dried on the base, the anisotropic magnetic particles are oriented in the intended recording direction by the action of a magnetic field. The magnetic layers are then calendered by passing the coated base between heated, polished rolls. The thickness of the magnetic layer is in general from 2 to 6 $\mu$m.

The Examples below further illustrate the process according to the invention, and the comparative experiments demonstrate the advance in the art represented by the novel process.

The iron(III) oxide hydroxide used as starting material is primarily characterized by the BET nitrogen surface area $S_{N2}$.

The magnetic properties of the pigment were measured with a vibrating sample magnetometer in a magnetic field of 160 kA/m after magnetization to saturation in a discharge capacitor. In the case of the powder measurements, the coercive force, $H_c$, measured in kA/m, is based on a tamped density of $\rho = 1.6$ g/cm$^3$. The specific remanence $M_r/\rho$ is given in nTm$^3$/g.

The video recording behavior of the magnetic recording media manufactured with the individual pigments was assessed on a tape transport apparatus comprising stationary video heads and a rotating endless tape loop, which permitted simultaneous recording and playback. A reference tape served as comparison.

The quantities measured for characterizing the individual tapes were the luminance signal-to-noise ratio (RF-S/N), i.e. the ratio of the carrier level at 4.5 MHz to the noise level at 3.5 MHz, measured at 30 kHz bandwidth, and the chrominance signal-to-noise ratio (CR-S/N), i.e. the ratio of the color subcarrier level at 0.75 MHz to the noise level at 0.65 MHz, measured with 30 kHz bandwidth. The quantities are taken from frequency response curves which are obtained by recording a carrier frequency of 5 MHz which has been so modulated in the phase at a small modulation index that two equal side-bands of constant spectral signal density from 0 to 10 MHz are obtained at the optimum bias setting of the tape.

In the tests, the tape/head relative speed was 4.75 m/s; the playback head was made of ferrite, and the recording head of Sendust.

BRIEF DESCRIPTION OF THE DRAWING

The drawing is a pH/time diagram which represents the course of the reaction. The diagram is described in detail in connection with Example 2.

EXAMPLE 1

A 10 liter glass vessel, equipped with a stirrer, temperature and pH control means and feed lines for nitrogen and air, was charged with 1.34 l of a technical iron-(II) chloride solution ($\rho = 1.352$ g/cm$^3$) and water was added to make up the total volume to 6l. To this solution were added 4.8 g of NaH$_2$PO$_4$.2 H$_2$O (=0.75% of PO$_4^{3-}$, based on the theoretical yield of FeOOH). The solution then had a pH of 1.7. The batch was thermostated to 20° C. while 300 l of N$_2$ were passed through per hour. A hose pump was then used to add 1010 ml of 15% strength by weight NaOH, corresponding to a degree of precipitation of 50% of Fe(II). The temperature of the suspension rose slightly. After cooling the solution to 20° C., 600 liters of air/h was passed in instead of nitrogen, the reaction temperature being maintained at 20° C. After 86 minutes nucleation was complete, and the suspension had a pH of 3.4. The temperature was then raised from 20° to 32° C. while maintaining the other reaction conditions, and the growth process was carried out at pH 5.1 in the course of 245 minutes, the pH being kept at this value by the automatic pH control means which metered in an aqueous 15% strength NaOH solution as required. The pH of the solution was then raised to 9.0 by adding NaOH, and the $\gamma$-FeOOH particles were provided with a shape-stabilizing coating by adding 54.5 g of sodium silicate in 250 ml of H$_2$O. The pH rose to 10.2 by the end of the synthesis. The $\gamma$-FeOOH suspension was filtered on a suction filter, and the filter cake was washed by repeated suspension in water until it was chloride-free, and was then dried at 110° C. in a vacuum drying cabinet.

The $\gamma$-FeOOH obtained was heated at 500° C. in a stream of nitrogen (60 l (S.T.P)/ h) in a rotating flask for 30 minutes to give $\alpha$-Fe$_2$O$_3$ which was then reduced to the metal at 360° C. in a continuous tubular furnace with 220 l (S.T.P) of hydrogen/h, which was passed in countercurrently to the solid, the residence time being 8 hours. The metal powder obtained was finally passivated with an air/nitrogen mixture (30 l of N$_2$/5 l of air/h).

The results are shown in Table 1.

EXAMPLE 2

Example 1 was repeated except that 6.4 g of NaH$_2$PO$_4$.2 H$_2$O (=1.0% by weight of PO$_4^{3-}$, based on the theoretical yield of $\gamma$-FeOOH) were added to the initial charge. The nucleation phase took 67 minutes and the growth phase 56 minutes. The course of the reaction is represented in a pH/time diagram shown in FIG. 1. Nucleation phase I was followed by growth phase II and surface coating III. A marks the start of the introduction of air. Salient point B represents the point in time by which the phosphate ions must have been added, and C marks the commencement of shape stabilization of the $\gamma$-FeOOH particles by the addition of sodium silicate. The conversion to metal powder was carried out as described in Example 1. The results are shown in Table 1.

EXAMPLE 3

A 250 l vessel, equipped with a stirrer, temperature and pH control means and feed lines for nitrogen and air, was charged with 23.7 l of a technical iron(II) chloride solution (428 g of FeCl$_2$ per liter) and 85 l of water, the pH of the solution being 2.5. The solution was gassed with 1000 l of N$_2$/hour and thermostated to 20° C. After this temperature had been reached, 18.4 l of 15% strength NaOH, corresponding to a degree of precipitation of 50%, were metered in in the course of 10 minutes. Immediately after the precipitation, 87.5 g of NaH$_2$PO$_4$.2 H$_2$O, dissolved in 1 l of water, were added (0.75% of PO$_4^{3-}$, based on the theoretical yield of $\gamma$-FeOOH). The stream of nitrogen was then replaced by 3700 l of air/h, the reaction temperature being maintained at 20° C. After 60 minutes nucleation was complete, and the suspension had a pH of 3.4. The temperature was then raised from 20° to 32° C. while maintaining the other conditions, and the growth process was carried out at pH 5.1 in the course of 127 minutes, the pH being kept at this value by the automatic pH control means which metered in an aqueous 15% strength NaOH solution as required. The solution was then brought to pH 9.0 by pumping in 3 l of 15% strength NaOH, and the $\gamma$-FeOOH particles were provided with an SiO$_2$ coating by adding 880 g of sodium silicate, dissolved in 2 l of water. The solution then had a pH of 9.6. The suspension was suction-filtered and washed 5 times with hot water until the filtrate was chloride-free. The product was dried at 110° C. in a vacuum drying cabinet.

The $\gamma$-FeOOH obtained was heated at 500° C. in a stream of nitrogen for 90 minutes to give $\alpha$-Fe$_2$O$_3$ which was subsequently reduced to the metal at 380° C. in a continuous tubular furnace in the course of 7 hours, using 3.5 m$^3$ (S.T.P) of hydrogen/h which was passed in countercurrently to the solid. The metal powder obtained was finally passivated with an air/nitrogen mixture. The results are shown in Table 1.

EXAMPLE 4

Example 3 was repeated, except that the phosphate was added before the precipitation of the Fe(OH)$_2$. The $\gamma$-FeOOH obtained was heated at 550° C. in a stream of nitrogen in a continuous tubular furnace for 90 minutes to give $\alpha$-Fe$_2$O$_3$ which was then reduced to the metal at 375° C. in a continuous tubular furnace in the course of 7 hours. The metal powder obtained was likewise passivated with an air/nitrogen mixture. The results are shown in Table 1.

EXAMPLE 5

Example 4 was repeated, except that 116.7 g of NaH$_2$PO$_4$.2 H$_2$O (1.0% by weight of PO$_4^{3-}$, based on the theoretical yield of $\gamma$-FeOOH) were added. On conclusion of the growth phase, the $\gamma$-FeOOH was treated as follows: the suspension was brought to pH 9 with 15% strength NaOH. 1001 g of NiSO$_4$. 6 H$_2$O, dissolved in 3 l of water, were then added, the pH being kept at 9 by pumping in further sodium hydroxide solution. Stirring was continued for 30 minutes, after which 1201 g of sodium silicate, dissolved in about 4 l of water, were added. The pH of the suspension rose to 10.1. Stirring was carried out for a further 30 minutes, after which 200 ml of olive oil were added. After stirring for a further 30 minutes, the resulting suspension was poured onto a suction filter and worked up as described in Example 3. The $\gamma$-FeOOH obtained was prereduced in a rotating flask under nitrogen at 380° C. to FeO$_x$ which was subsequently reduced to the metal in a continuous tubular furnace, as described in Example 3, and then passivated. The results are shown in Table 1.

EXAMPLE 6

A 10 liter glass vessel, equipped with a stirrer, temperature and pH control means, and feed lines for air and nitrogen, was charged with 1.43 l of a technical iron(II) chloride solution (density = 1.328 g/ml) and 2.01 ml of 85% strength phosphoric acid (=0.75% of $PO_4^{3-}$), and water was added to make up the total volume to 6l. The pH of the solution was then 1.44. The solution was thermostated to 20° C. while 200 l of $N_2$ were passed through per hour. 1000 ml of 15.1% strength NaOH were then pumped in to precipitate 50% of the Fe(II) ions as $Fe(OH)_2$. The nitrogen stream was then replaced by 600 l of air per hour, the reaction temperature being maintained at 20° C. After 75 minutes, nucleation was complete and the suspension had a pH below 4. The temperature was then raised from 20° C. to 32° C. while maintaining the other reaction conditions and the growth process was carried out at pH 5.1 in the course of 210 minutes, the pH being kept at this value by the automatic pH control means which metered in an aqueous 15.1% strength NaOH solution as required. To the suspension were then added 11.82 g of $SnCl_2 . 2 H_2O$, dissolved in 5 ml of concentrated HCl made up to 100 ml with water. The pH of the solution was then 1.6. 15.1% strength NaOH was used to bring the solution back to pH 7, and 10 ml of olive oil were added.

The resulting suspension was suction-filtered, and the filter cake was washed by repeated suspension in water until it was chloride-free, and was then dried at 100° C. in a vacuum drying cabinet. The finished $\gamma$-FeOOH was prereduced to $FeO_x$ by heating at 380° C. in a nitrogen stream in a rotating flask for 30 minutes, with decomposition of the organic substance, and was then reduced to the metal at 300° C. in a hydrogen stream in a continuous rotating furnace in the course of 8 hours. The pyrophoric metal powder was likewise passivated with an $N_2$/air mixture. The results are shown in Table 1.

EXAMPLE 7

Example 5 was repeated, except that 2.68 ml of 85% strength phosphoric acid were added in the initial charge (=1.0% of $PO_4^{3-}$, based on $\gamma$-FeOOH). The conditions under which $\gamma$-FeOOH was converted to the metal pigment were the same as those described in Example 5. The results are shown in Table 1.

EXAMPLE 8

A vessel, having a capacity of 51 $m^3$ and equipped with a stirrer, temperature and pH control means, and an air feed line, was charged with 24 $m^3$ of water, 6.95 $m^3$ of 30.65% strength iron(II) chloride solution and 12.1 kg of 62% strength phosphoric acid (=0.5% of $PO_4^{3-}$). 5.4 $m^3$ of 15% strength NaOH were added at 20°-22° C., with stirring, in the course of 30 minutes, and then 2700 $m^3$ (S.T.P) of air/h were passed in. After 300 minutes nucleation was complete. The pH of the orange suspension was 2.8. The temperature was raised to 35° C. and, while continuing to introduce air (2700 $m^3$ (S.T.P)/h), 5.4 $m^3$ of 14.9% strength NaOH were so metered in in the course of 270 minutes that a pH of 5.15±0.15 was maintained. At the end of the growth phase 11.4 kg of $SnCl_2 . 2 H_2O$, dissolved in water, were added to the reaction mixture which was then brought to pH 8.0. The suspension was then circulated by pumping for 2 hours with stirring.

Half the suspension had 30 l of olive oil added to it, and was then heated to 50° C. and stirred for a further 2 hours. The suspension was then filtered on a filter press, and the solid filter cake was washed with water until the pH was 7. The product was dried at 160° C. in air in a band dryer.

The $\gamma$-FeOOH obtained was prereduced to $FeO_x$ by heating at 450° C. in a stream of nitrogen in the course of 90 minutes, with decomposition of the organic compound, and was then reduced to the metal with hydrogen at 330°-350° C. in a fluidized bed reactor in the course of 28 hours. The pyrophoric metal particles were subsequently passivated in an $N_2$/air mixture. The results are shown in Table 1.

EXAMPLE 9

Example 3 was repeated, except that shape stabilization was effected with 1% by weight of nickel and 1.5% by weight of $SiO_2$ after conclusion of the growth phase.

The $\gamma$-FeOOH obtained was heated at 700° C. in a stream of nitrogen for 90 minutes to give nickel-doped $\alpha$-$Fe_2O_3$ which was then reduced to the metal at 400° C. in a continuous tubular furnace in the course of 7 hours, using 3.5 $m^3$ (S.T.P)/h of hydrogen introduced countercurrently to the solid. The metal powder obtained was finally passivated with an air/nitrogen mixture. The results are shown in Table 1.

COMPARATIVE EXAMPLE 1

A vessel, having a capacity of 51 $m^3$ and equipped with a stirrer, temperature and pH control means, and an air feed line, was charged with 24 $m^3$ of water. 6.95 $m^3$ of 30.5% strength technical $FeCl_2$ solution were then added, and the solution was thermostated to 21° C. 5.40 $m^3$ of 15.0% strength NaOH were added to precipitate 50% of the Fe(II) ions as $Fe(OH)_2$. At 22°-24° C. 3000 $m^3$ of air per hour were then passed through the suspension, and after 220 minutes nucleation was complete. The suspension was then heated to 33°-34° C. while maintaining the other reaction conditions, and the growth process was carried out at ph 4.9±0.2 in the course of 275 minutes, the pH being kept in this range by the pH control means which metered in 5.24 $m^3$ of 15.0% strength NaOH as required. At the end of the growth phase, the suspension was brought to pH 5.5, filtered through membrane filter presses and washed until chloride-free. The product was dried at 170° C. in air in a band dryer. The $\gamma$-FeOOH obtained was dehydrated at 450° C. in a stream of nitrogen (15 $m^3$ (S.T.P)/h) in the course of 60 minutes and was then reduced to the metal at 320°-340° C. in a hydrogen stream in the course of 17 hours. This was followed by passivation of the metal particles in a nitrogen/air mixture.

The results are shown in Table 1.

COMPARATIVE EXAMPLE 2

Example 8 was repeated except that the growth process was also carried out at 20° C. and the pH during the growth process was maintained at 3.6-3.8. The product was dried at 170° C. in air in a band dryer. After shape stabilization of the resulting $\gamma$-FeOOH with 1% by weight of $SiO_2$, the conversion to the metal pigment was effected by reduction at 350° C. in a hydrogen stream in the course of 38 hours. The product was then passivated with a nitrogen/air mixture.

The results are shown in Table 1.

COMPARATIVE EXAMPLE 3

Example 1 was repeated, except that the nucleation phase was carried out in the presence of 12.8 g of $NaH_2PO_4 \cdot 2H_2O$ (=2.0% of $PO_4^{3-}$, based on the theoretical yield of $\gamma$-FeOOH). The conversion to the metal pigment was effected by heating under nitrogen in a rotating flask to give $Fe_2O_3$ and subsequent reduction at 380° C. with hydrogen in a batch tubular furnace. The results are shown in Table 1.

TABLE 1

| | $\gamma$-FeOOH | | | Metal powder | | |
|---|---|---|---|---|---|---|
| | $S_{N2}$ [m²/g] | $PO_4^{3-}$ [%] | Coating % | $S_{N2}$ [m²/g] | $H_c$ [kA/m] | $M_r$ [nTm³/g] |
| Example 1 | 49.7 | 0.75 | 0.97 Si | 38.2 | 72.3 | 72.6 |
| Example 2 | 74.3 | 1.0 | 1.30 Si | 43.9 | 69.9 | 72.3 |
| Example 3 | 52.2 | 0.75 | 0.98 Si | 35.0 | 72.7 | 76.1 |
| Example 4 | 49.6 | 0.75 | 0.96 Si | 47.0 | 78.2 | 78.0 |
| Example 5 | 84.9 | 1.0 | 1.35 Si 1.60 C 2.75 Ni | 48.3 | 60.8 | 78.5 |
| Example 6 | 60.8 | 0.75 | 1.60 Sn 1.60 C | 33.2 | 70.6 | 82.0 |
| Example 7 | 60.8 | 1.0 | 0.85 Sn 1.90 C | 35.1 | 63.6 | 71.9 |
| Example 8 | 36.9 | 0.5 | 0.27 Sn | 17.8 | 64.8 | 93.0 |
| Example 9 | 49.9 | 0.75 | 0.97 Ni 0.97 Si | 36.6 | 72.5 | 83.8 |
| Comparative example 1 | 32.0 | 0.0 | none | 22.1 | 70.2 | 100.0 |
| Comparative example 2 | 51.9 | 0.0 | 1.00 Si | 27.7 | 69.9 | 70.0 |
| Comparative example 3 | 146.3 | 2.0 | 1.50 Si | 57.6 | 75.8 | 103.0 |

EXAMPLES B1–B8

In each case, 640 parts of a 12.5% strength solution of a thermoplastic polyester urethane, prepared from adipic acid, butane-1,4-diol and 4,4'-diisocyanatodiphenylmethane, in a mixture of equal parts of tetrahydrofuran and dioxane and 100 parts of a 20% strength solution of a phenoxy resin of bisphenol A and epichlorohydrin in the same solvent mixture were dispersed with 810 parts of metal powder from the Examples indicated in Table 2 and Comparative Experiments 1 and 2, 2.25 parts of sodium oleate, 27 parts of aluminum oxide, 90 parts of chromium dioxide having a coercive force of 50 kA/m, 14 parts of a vinylpyrrolidone/vinyl acetate copolymer having a molecular weight of 10,000 and a further 600 parts of the said solvent mixture in a ball mil having a capacity of 6000 parts by volume and containing 8000 parts of steel balls from 4 to 6 mm in diameter, for 4 days. Then a further 640 parts of the said polyester urethane solution, 100 parts of the phenoxy resin solution, 18 parts of butyl stearate, 4.5 parts of stearic acid and 400 parts of the said solvent mixture were added, and dispersion was effected for a further 24 hours. The dispersion obtained was filtered under pressure through a filter having 5 μm pores and was applied to a 14.5 μm thick polyethylene terephthalate film by means of a conventional knife coater.

The coated film was passed through a magnetic field to orient the magnetic particles and was then dried at 60°–80° C. After drying, the magnetic layer was calendered by passing the coated film twice between heated rolls (90° C.) under a nip pressure of 35 kg/cm. The thickness of the magnetic layer was then 4 μm. The coated film was slit into 1/2 inch wide video tapes which were tested on the loop tape transport apparatus described above.

TABLE 2

| Example | B1 | B2 | B3 | B4 | B5 | B6 | B7 | B8 |
|---|---|---|---|---|---|---|---|---|
| Magnetic material example | 2 | 3 | 4 | 7 | 8 | 9 | C1 | C2 |
| RF-S/N [dB] | +1.5 | +3.5 | +3.5 | +2.0 | +2.5 | +1.5 | +0.5 | ±0 |
| CR-S/N [dB] | +4.0 | +3.5 | +3.5 | +5.0 | +5.0 | +3.5 | +3.5 | +2.0 |

We claim:

1. A process for preparing acicular ferromagnetic metal particles consisting essentially of iron which comprises:
    adding from 0.5 to 1.5% by weight, based on the amount of $\gamma$-FeOOH end product, of phosphate ions in the form of orthophosphoric acid or primary, secondary or tertiary alkali metal or ammonium salts of orthophosphoric acid to an iron (II) salt solution while simultaneously passing air into the solution, whereby $\gamma$-FeOOH nuclei are precipitated from the solution;
    adjusting the pH of the suspension of $\gamma$-FeOOH nuclei to from 4.0–5.5 whereby the nuclei are allowed to grow;
    adding silicon dioxide, tin dioxide or a mixture thereof of the suspension to coat the surface of the $\gamma$-FeOOH particles;
    isolating the coated particles; dehydrating the particles at 350°–600° C. to form $\alpha$-iron (III) oxide; and thereafter
    reducing the particles to the metal state in the presence of a reducing gas.

* * * * *